United States Patent
Mueller

(10) Patent No.: US 8,067,097 B2
(45) Date of Patent: Nov. 29, 2011

(54) WOVEN LAMINATE AS LINING FOR SOUND ABSORPTION OF INLET AND OUTLET SOUND ABSORBERS AND METHOD OF PRODUCTION OF AN ACOUSTIC INSULATION UNIT

(75) Inventor: Ulrich Mueller, Hueckelhoven (DE)

(73) Assignee: Melicon GmbH (DE)

( * ) Notice: Subject to any disclaimer, the term of this patent is extended or adjusted under 35 U.S.C. 154(b) by 721 days.

(21) Appl. No.: 12/085,731

(22) PCT Filed: Nov. 24, 2006

(86) PCT No.: PCT/EP2006/011283
§ 371 (c)(1),
(2), (4) Date: Aug. 8, 2008

(87) PCT Pub. No.: WO2007/062781
PCT Pub. Date: Jun. 7, 2007

(65) Prior Publication Data
US 2009/0169913 A1    Jul. 2, 2009

(30) Foreign Application Priority Data
Nov. 30, 2005   (DE) .......................... 10 2005 057 024

(51) Int. Cl.
*B32B 5/26* (2006.01)
*B32B 15/14* (2006.01)
*F01N 1/24* (2006.01)
*G10K 11/168* (2006.01)

(52) U.S. Cl. ............ 428/608; 428/594; 428/613; 245/2; 140/112; 442/234; 219/86.1; 180/290; 29/897.15

(58) Field of Classification Search .................. 428/605, 428/608
See application file for complete search history.

(56) References Cited

U.S. PATENT DOCUMENTS

| | | | | | |
|---|---|---|---|---|---|
| 1,745,173 | A | * | 1/1930 | Leonard | 428/592 |
| 2,262,455 | A | * | 11/1941 | Goodloe | 15/229.11 |
| 3,057,481 | A | * | 10/1962 | Pall | 210/493.5 |
| 3,469,297 | A | * | 9/1969 | Webber | 428/605 |

(Continued)

FOREIGN PATENT DOCUMENTS

DE         10345575         *    1/2005

(Continued)

OTHER PUBLICATIONS

International Preliminary Report on Patentability (with English translation) for PCT/EP2006/011283 dated Jul. 17, 2008.

*Primary Examiner* — John J Zimmerman
(74) *Attorney, Agent, or Firm* — Harness, Dickey & Pierce, P.L.C.

(57) ABSTRACT

A woven laminate for sound absorption that includes a first woven layer, a second woven layer, and a third woven layer. The first woven layer has a coarse structure. The second woven layer has a fine structure. The third woven layer has a medium structure. Each of the first, second, and third woven layers are composed of metallic wires that are woven to each other or interlaced as a fleece. At least one of the first, the second, and the third woven layers are superimposed in order to form the woven laminate. The woven layers are placed in the layer order fine-coarse-medium. The woven layers are welded together at least partially.

21 Claims, 2 Drawing Sheets

U.S. PATENT DOCUMENTS

Figure 1:
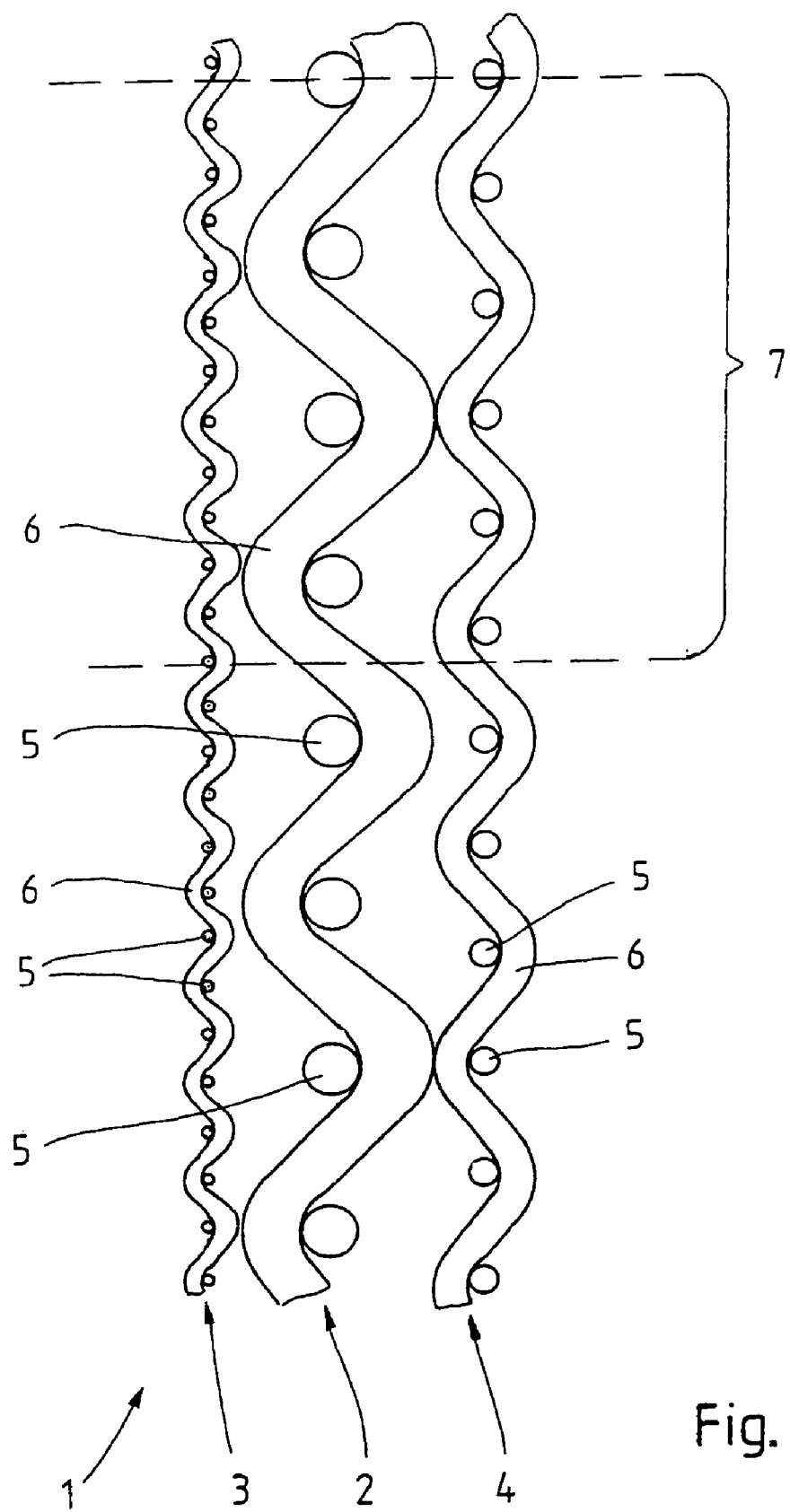

| | | | | |
|---|---|---|---|---|
| 3,795,288 A | * | 3/1974 | Pall | 181/224 |
| 3,907,513 A | * | 9/1975 | Sheinberg | 428/549 |
| 3,948,295 A | * | 4/1976 | Lemont et al. | 138/147 |
| 4,037,751 A | * | 7/1977 | Miller et al. | 428/593 |
| 5,059,326 A | * | 10/1991 | Haerle | 210/491 |
| 5,904,756 A | * | 5/1999 | Fujii et al. | 96/188 |
| 2002/0074282 A1 | * | 6/2002 | Herrmann et al. | 210/490 |
| 2003/0049559 A1 | * | 3/2003 | Shigemori et al. | 430/137.18 |
| 2003/0118762 A1 | | 6/2003 | Brown et al. | |

FOREIGN PATENT DOCUMENTS

| | | |
|---|---|---|
| EP | 0 486 427 A1 | 5/1992 |
| EP | 0 542 124 A | 5/1993 |

\* cited by examiner

ND STAGE APPLICATION

WOVEN LAMINATE AS LINING FOR SOUND ABSORPTION OF INLET AND OUTLET SOUND ABSORBERS AND METHOD OF PRODUCTION OF AN ACOUSTIC INSULATION UNIT

CROSS-REFERENCE TO RELATED APPLICATIONS

This application is a U.S. National Stage Application of International application No. PCT/EP2006/011283, filed Nov. 24, 2006 and published in German as WO 2007/062781 A2 on Jun. 7, 2007. This application claims the benefit of German Application No. DE 10 2005 057 024.0, filed Nov. 30, 2005. The disclosure(s) of the above applications are incorporated herein by reference.

FIELD

The present invention relates to a woven laminate as lining for sound absorption of inlet and outlet sound absorbers in an auxiliary gas turbine (APU) of an aircraft, in particular an aeroplane. The invention also relates to an acoustic insulation unit comprising such a woven laminate as well as a method for producing the same one.

BACKGROUND

Woven laminates of the initially mentioned type are known from the state of the art. So called microporous cover materials are used for the sound absorption in hot gas flows. This is in particular always the case when the frequencies to be absorbed are comprised in the range above 800 Hz up to 6000 Hz, as they occur in turbines or other fast running rotary systems, such as for example in auxiliary gas turbines (APUs) of aeroplanes or the like.

The functioning of the microporous materials is to convert the energy of sound pressure waves into thermal energy. For this, it is necessary to cause a certain pressure loss by means of the microporous material. The partially high temperatures of the combustion gases of gas turbines of up to 900° C. require a corresponding material on metallic or ceramic base. The large field of metallic materials offers different possibilities for this.

One of the most famous solutions is the use of sintered metal fibre fleeces, such as they are also used for the purpose of the solid/liquid filtration. Such metal fibre fleeces are inserted in cylindrical form as a lining into a sound absorber section of an APU. Herein, the high weight of these fleeces as well as also their further processing by welding, which is extremely complicate, presents a substantial disadvantage. Another disadvantage are the long sintering times which lead to high costs and the brittle behaviour of the sintered material. This is essentially caused by the material to be selected, which always comprises a strong oxide forming alloying addition due to the high temperatures. A typical material for this is an alloy of FeCrAlY. A metal fibre fleece having sound absorbing properties is known from DE 102004018810 A1.

Therefore, new developments intend to substitute these metal fibre fleeces by woven textiles or woven laminates. These ones are single or multi-layer woven wires that are combined to solid woven laminates by means of a sintering process. Typically, one of the woven layers acts as acoustically active layer because of the selected microporous mesh.

Furthermore, reinforced metal fibre mats are known from the state of the art, such as for example from DE 12 98 507 A. The here described metal fibre mat consists of overlapping metal fibres that are arbitrarily distributed in a mated body and connected to each other by in particular sintering, wherein the particularity is that a permeable metal insert, that is provided with a greater free screen section than the mat, is embedded in and metallurgically connected to at least one surface of the metal fibre mat. The thus formed metal fibre mat serves in particular as insert for liquid filters.

Furthermore, a combined band for sound absorption, filter and padding purposes is known from the German Utility Model 19 68 840. This band is composed of two or more types of appropriate fleece-like material or wire mesh, wherein the inner core region is formed by glass, mineral or rock wool and the outer zone is formed by steel wool and/or wire mesh.

SUMMARY

The present teachings provide for a woven laminate for sound absorption that includes a first woven layer, a second woven layer, and a third woven layer. The first woven layer has a coarse structure. The second woven layer has a fine structure. The third woven layer has a medium structure. Each of the first, second, and third woven layers are composed of metallic wires that are woven to each other or interlaced as a fleece. At least one of the first, the second, and the third woven layers are superimposed in order to form the woven laminate. The woven layers are placed in the layer order fine-coarse-medium. The woven layers are welded together at least partially.

The present teachings further provide for a first layer of woven metallic wires each including a first cross-section, a second layer of woven metallic wires each including a second cross-section, and a third layer of woven metallic wires each including a third cross-section. The first layer is between the second layer and the third layer. The first cross-section is larger than the second cross-section and larger than the third cross-section. The third cross-section is smaller than the first cross-section and larger than the second cross-section. The first layer, the second layer, and the third layer are welded together at spaced apart weld sites.

The present teachings also provide for a first layer of woven first metallic wires each having a first cross-section, a second layer of woven second metallic wires each having a second cross-section, and a third layer of woven third metallic wires each having a third cross-section. The first cross-section of each of the first metallic wires is larger than the second cross-section of each of the second metallic wires and larger than the third cross-section of each of the third metallic wires. The second cross-section of each of the second metallic wires is smaller than the first cross-section of each of the first metallic wires and smaller than the third cross-section of each of the third metallic wires. The first layer is between the second layer and the third layer. The first layer, the second layer, and the third layer are welded together at each of a plurality of spaced apart weld sites.

DRAWINGS

Figure 2:
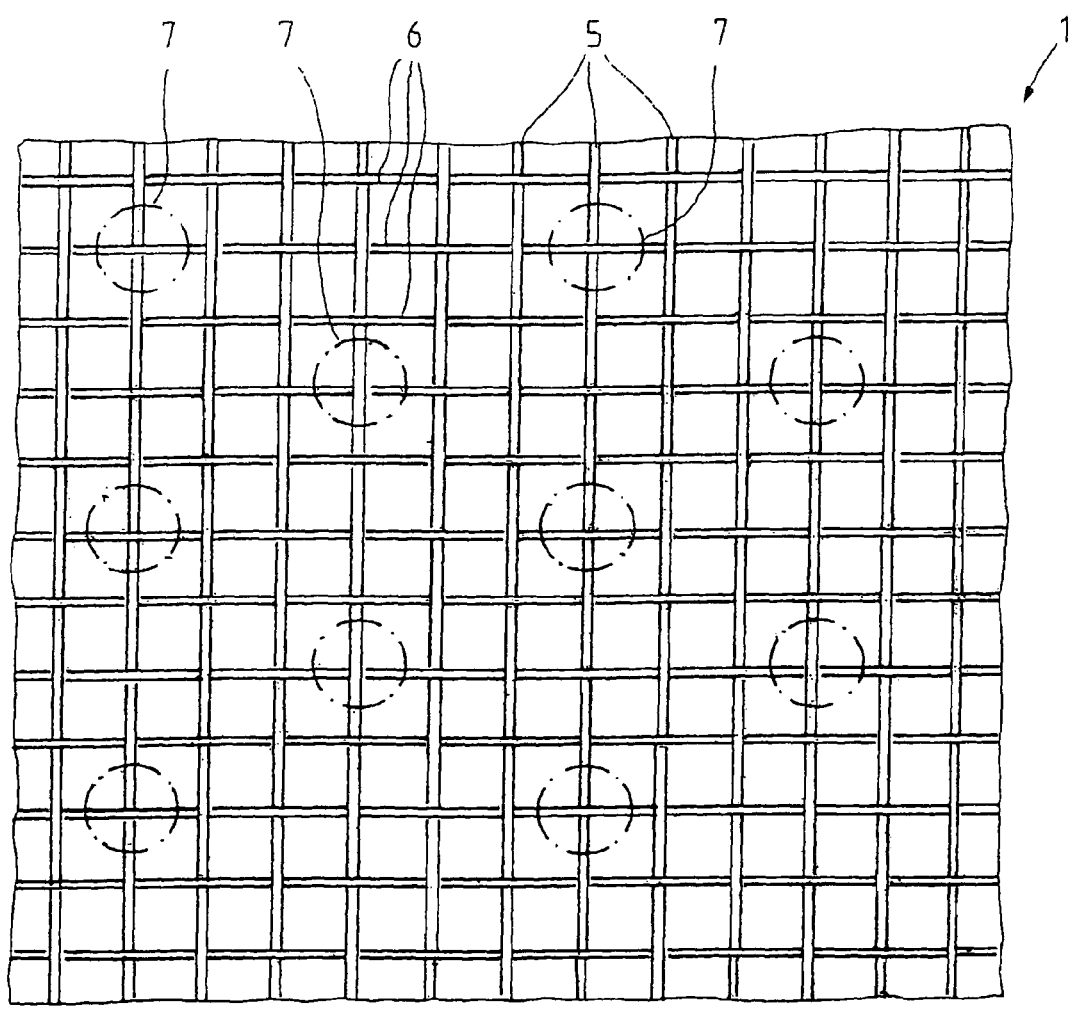

FIG. 1 is a schematic cross-sectional view of a woven laminate according to the present teachings; and FIG. 2 is a schematic top view of the woven laminate of FIG. 1.

DETAILED DESCRIPTION

Based upon this state of the art, it is the object of the present invention to provide a woven laminate having acoustic damping characteristics, which has good deformation properties as well as a sufficient resistance with respect to high temperatures combined with a high corrosion resistance in sulphur bearing hot gases and simultaneously excludes the disadvantages related to a sintering process.

This aim is achieved by a woven laminate having the initially described characteristics, which comprises at least three superimposed and at least partially welded together woven layers, one of which has a relatively coarse structure with respect to the others, another one has a fine structure and the remaining woven layer has a structure between the coarse and the fine structure, wherein the woven layers present metallic wires that are woven to each other or twisted in a fleece-like manner.

Preferably, the woven layers are placed in the layer order fine-coarse-medium. It has been found that such a woven laminate has excellent acoustic damping properties that correspond to those of laminates according to the state of the art or are even better. It has furthermore been found that the woven laminate according to the invention has excellent flexional properties depending on the direction. Thus, the woven laminate can be clearly more bent into the direction of the woven layer having a fine structure than it is possible with known laminates, without the single woven layers getting detached. The woven laminate according to the invention is thus suitable in an excellent manner for the use as acoustic insulation unit, for example as covering of drive aggregates or parts thereof as well as lining of motor spaces and especially as acoustically active lining of sound absorbers in APUs of aircrafts, such as aeroplanes. According to its flexional properties, the woven laminate can be adapted to nearly any shapes and bending radii of the elements to be acoustically insulated. In particular, it also shows a very good thermal welding behaviour.

The structure of the woven layers in the sense of the present invention is determined by the diameter of the wires and/or the respective mesh or hollow size between the wires. Thus, the woven layer of coarse structure can be for example composed of wires, the cross section of which is greater than the one of the wires of the remaining woven layers. In the same manner, the woven layer of fine structure is then composed of wires, the cross section of which is smaller than the one of the wires of the remaining woven layers. The woven layer of medium structure has thus wires, the cross section of which is comprised between the above mentioned wires. The structure of the woven layers can also be defined by the mesh or hollow size between the wires that are woven to each other. In this case, the woven layer of coarse structure has the greatest mesh or hollow size among the three interconnected woven layers, whereas the woven layer of fine structure has the smallest mesh or hollow size among the three woven layers. The mesh or hollow size of the woven layer of medium structure is comprised between the meshes or hollow sizes of the two other woven layers.

According to an advantageous embodiment of the invention, the woven layers respectively comprise different meshes. Mesh in this sense means the clearance between the wires that form the woven layer. The selection of suitable meshes and a corresponding combination enables to adjust the acoustic properties of the woven laminate individually. The woven laminate according to the invention can thus be adapted in an excellent manner to different acoustic conditions of different uses.

In an embodiment of the invention it is proposed that the woven layers respectively present different bindings. In the case of a woven structure, the binding of a woven layer means the pattern generated by the arrangement of the warp and weft wires with respect to each other. In the context of the woven laminate according to the invention all known bindings can be used. Dependent of the used binding, each woven layer has individual properties, such as for example slip resistance, surface structure, direction dependent extensibility, etc. The combination of woven layers having different bindings also enables to individually adjust the properties of the woven laminate dependent on the direction. This also enables to realise an as small mesh as possible with as thick wires as possible, which is of high importance for a sufficient resistance against hot gas corrosion.

According to another embodiment of the invention, another possibility to influence the structure of woven layers is that the woven layer of fine structure consists of interwoven wires that have a smaller cross section in comparison to the wires of the woven layer of medium structure. Accordingly, the woven layer of coarse structure is composed of wires that have a greater cross section than the wires of the woven layer of medium structure.

An especially advantageous embodiment of the invention provides that the wires are made of a high temperature resistant alloy. The use of such a material enables to manufacture woven laminates that can advantageously resist the high temperatures in the exhaust gas flow of an APU. A MCrAlY alloy has proven especially suitable. Herein, M stands for the alloying elements Ni, Co or Fe or the combinations thereof. One can also use other alloying constituents of the rare earths instead of Y, such as for example hafnium, cerium, scandium or zirconium and combinations thereof. Beside their high heat-resistance, these alloys present a sufficiently high deformability as well as weldability. By using woven layers of different materials, the thermo-mechanic and acoustic characteristics of the woven laminate can be varied. A combination of woven layers consisting of metallic materials and woven layers made of plastic or ceramic, for example fireproof wovens, etc. that can be passed through by metal wires for being connectable to metallic woven layers, is also imaginable. A woven laminate manufactured in this way shows especially good acoustic absorption properties of up to 80% and for single tones of up to 100% in a frequency range comprised between 800 and 4000 Hz. This clearly beats the hitherto known metal fibre fleeces.

According to an especially advantageous embodiment of the invention, the woven layers, independent from the present layer structures, are connected by means of a defined number of welding spots placed with a defined distance from each other. Another advantage of the invention is that a previous flattening of the single woven layers can be omitted. Such a woven laminate can be for example manufactured by using correspondingly profiled welding electrodes. These ones can be for example provided with periodically arranged thorn-like projections that are located corresponding to the distance and number of the welding spots to be applied. The profiled electrodes contact the woven layers to be welded only with their projecting profile regions, whereupon the woven layers are only welded to each other in these regions. Advantageously, a woven laminate is thus manufactured that does not present connections by welding at all contact points of the woven layers, but only in the regions determined by the geometry of the welding electrode. A suitable selection of the number and the distances of the welding connections enables to obtain a higher or lower shifting capacity of the single woven layers with respect to each other whereby the deformability of the woven laminate transversely to the extension plane thereof can be adjusted and improved. In the regions between the individual welding spots in which the woven layers are not even connected to each other at their contact points, the woven layers can realise slight position changes with respect to each other, such that a compensation of flexional tensions that are generated in the woven laminate during the deformation thereof can be obtained. Herein, the single welding spots provide for a sufficiently strong cohesion of the woven layers, such that, in spite of a high deformability, the woven laminate assures a safe adhesion of the woven layers to each other.

The woven laminate according to the invention is highly suitable for a use as acoustic insulation unit. Due to its good deformation properties, the woven laminate can be formed to a tube-shaped acoustic insulation unit that can be used in the context of sound absorbing units for combustion engines and other rotating systems, such as for example worm compressors of any type. According to an especially advantageous proposal of the invention, the woven laminate is bent, such that the woven layer having the fine structure obtains the smallest bending radius. Due to its light weight and its high temperature resistance, such an acoustic insulation unit is highly suitable for a use as sound absorber lining in a muffler of an APU of an aircraft, in particular an aeroplane.

Furthermore, the invention proposes a method for the production of an acoustic insulation unit having a woven laminate, which method comprises the following steps:

a) positioning three superimposed woven layers of different structure in a gap between opposite electrodes, such that the woven layer of fine structure is adjacent to the woven layer of coarse structure and the woven layer of medium structure is adjacent to the woven layer of coarse structure on the side opposite the woven layer of fine structure, b) applying an electric current to the electrodes and the regions of the woven layers in the gap, such that these ones are at least partially connected to each other by means of resistance welding, c) bending the welded together woven layers into the desired shape of the acoustic insulation element, such that the woven layer having a fine structure obtains the smallest bending radius.

The electrodes used in the method according to the invention can have any form. For example, they can be stamp-like electrodes that are moved towards each other in the way of a press-slide, and the side of the electrodes that faces the woven layers to be welded is profiled corresponding to the distance and the number of welding spots to be applied or is plain for welding the woven laminates at all the contact points. However, the electrodes can also be provided with a free form surface, by means of which the woven layers to be welded to each other are already converted into their final form during the welding. Advantageously, a subsequent forming process can be omitted thereby. Furthermore, the electrodes can be formed by rotating rolls, for example made of copper, by means of which the woven layers to be welded to each other are continuously conveyed. Like the above explained stamp electrodes, the rolls are not profiled or correspondingly profiled. The woven laminates according to the invention can be manufactured advantageously fast at low cost and without high efforts with nearly any length and form or as endless material by means of the method according to the invention. In the case of stamp electrodes, the step b) of the method can be repeated as often as desired for producing woven laminates of nearly any size, wherein the woven layers are present as endless material and are, after welding, further conveyed piece by piece between the electrodes until regions of the woven layers that have not been welded together yet will be placed between the electrodes. After welding, the woven laminate can be preferably automatically cut into corresponding dimensions and subsequently bent into the form required for the acoustic insulation unit.

An especially advantageous form of the method according to the invention provides that during welding of the single woven layers, a copper weft is arranged between the woven layers to be welded to each other and the electrodes. This copper weft serves for a better control of the welding current and causes a defined current transition from the electrodes into the woven layers.

Thanks to the structure of the copper weft, the current transition between electrodes and woven layers can be limited to defined regions, such that the above described defined pattern of welding spots is obtained, independent from the structure of the woven layers. The copper weft only serves for influencing the current transition and is not welded to the woven layers.

Other advantages and characteristics of the present invention result from the following exemplary description of preferred and not limiting exemplary embodiments by means of the figures.

FIG. 1 shows a schematic cross section through a woven laminate 1, whereas FIG. 2 shows a schematic top view of the laminate of FIG. 1.

The woven laminate 1 is composed of three single woven layers. A coarse woven layer 2 is arranged in the centre of the woven laminate 1. On the one side of the coarse woven layer 2, a fine woven layer 3 is placed. On the side of the coarse woven layer 3 that is located opposite the fine woven layer, a woven layer 4 having a medium structure is placed.

Each of the woven layers 2, 3, 4 is composed of warp wires 5 and weft wires 6 that are woven to each other.

The warp wires 5 and the weft wires 6 are woven to each other by means of any bindings. In FIG. 1, all the woven layers are formed as linen weave.

The woven layers 2, 3, 4 are not welded to each other at all contact points, but only in defined welding regions 7, the number and distance of which are adapted to the mechanical properties of the woven laminate 1.

FIG. 2 shows a top view of the fine woven layer 3. One can clearly see the warp wires 5 and the weft wires 6 that are woven to each other. The welding connections 7 that connect the individual woven layers 2, 3, 4 to each other are indicated by means of dashed circles. The distance, the number and the arrangement of the welding connections 7 with respect to each other is independent from the structure, i.e. the type and fineness of the weft of the woven layers 2, 3, 4.

Therefore, the woven layers 2, 3, 4 are materially connected to each other only in the region of the welding connections 7, whereas they are only adjacent to each other without any material connection in the regions between the welding connections 7. In the region of the welding connections 7, the woven layers 2, 3, 4 cannot move with respect to each other, whereas slight displacements with respect to each other are possible in the regions between the welding connections 7 and can compensate flexional tensions between the individual woven layers 2, 3, 4 that occur during bending the woven laminate 1.

The invention claimed is:

1. A woven laminate for sound absorption, comprising:
a first woven layer having a coarse structure;
a second woven layer having a fine structure; and
a third woven layer having a medium structure;
wherein each of the first, second, and third woven layers are composed of metallic wires that are woven to each other or interlaced as a fleece;
wherein at least one of the first, the second, and the third woven layers are superimposed in order to form the woven laminate, wherein the woven layers are placed in the layer order fine-coarse-medium; and wherein the woven layers are welded together at least partially.

2. The woven laminate according to claim 1, wherein the wires of the woven layers consist of a high temperature corrosion resistant alloy.

3. The woven laminate according to claim 2, wherein the alloy of the wires is a MCrAlY alloy, wherein M represents one of the elements nickel, cobalt, and iron, or combinations thereof.

4. The woven laminate according to claim 2, wherein the alloy comprises alloying additions of the elements hafnium, cerium, scandium and zirconium or combinations thereof.

5. The woven laminate according to claim 1, wherein wires of the individual woven layers are composed of a corrosion resistant stainless steel.

6. The woven laminate according to claim 1, wherein the woven layers respectively comprise different meshes.

7. The woven laminate according to claim 1, wherein at least two woven layers have different bindings.

8. The woven laminate according to claim 1, wherein the woven layer of fine structure is composed of wires that have a smaller cross section than the wires of the woven layer of medium structure.

9. The woven laminate according to claim 1, wherein the woven layer of coarse structure is composed of wires that have a larger cross section than the wires of the woven layer of medium structure.

10. The woven laminate according to claim 1, wherein the woven layers are made of different materials.

11. The woven laminate according to claim 1, wherein the first woven layer is welded in points to the third woven layer.

12. The woven laminate according to claim 1, wherein the woven layers, independent from the present layer structures, are connected by means of a defined number of welding spots placed in a defined distance from each other.

13. The woven laminate according to claim 1, wherein the woven layers are connected to each other by means of resistance welding.

14. An acoustic insulation unit comprising:
a woven laminate according to claim 1, wherein the woven laminate has corresponding dimensions and is bent into a required shape for the acoustic insulation unit.

15. The acoustic insulation unit according to claim 14, wherein the woven laminate is bent, such that the woven layer having the fine structure obtains the smallest bending radius.

16. A method for producing an acoustic insulation unit comprising a woven laminate preferably according to claim 1, the method comprising the steps:
a) providing the first woven layer having the coarse structure, the second woven layer having the fine structure, and the third woven layer having the medium structure, wherein each of the first, the second, and the third woven layers are composed of metallic wires that are woven to each other or interlaced as a fleece;
b) positioning three superimposed woven layers in a gap between opposite electrodes, such that the second woven layer of fine structure is adjacent to the first woven layer of coarse structure and the third woven layer of medium structure is adjacent to the first woven layer of coarse structure on a side of the first woven layer opposite to the second woven layer of the fine structure;
c) applying an electric current to the electrodes and the regions of the woven layers in the gap, such that the woven layers are at least partially connected to each other by means of resistance welding; and
d) bending the woven laminate into the desired shape of the acoustic insulation unit, such that the second woven layer having the fine structure obtains the smallest bending radius.

17. The method according to claim 16, wherein a copper fabric is arranged between the woven layers to be connected and the electrodes.

18. The method according to claim 16, wherein at least one electrode comprises a surface formed as free form surface for contacting the woven layers.

19. A woven laminate for sound absorption comprising:
a first layer of woven metallic wires each including a first cross-section;
a second layer of woven metallic wires each including a second cross-section; and
a third layer of woven metallic wires each including a third cross-section;
wherein the first layer is between the second layer and the third layer;
wherein the first cross-section is larger than the second cross-section and larger than the third cross-section;
wherein the third cross-section is smaller than the first cross-section and larger than the second cross-section;
wherein the first layer, the second layer, and the third layer are welded together at spaced apart weld sites.

20. A woven laminate for sound absorption comprising:
a first layer of woven first metallic wires each having a first cross-section;
a second layer of woven second metallic wires each having a second cross-section; and
a third layer of woven third metallic wires each having a third cross-section;
wherein the first cross-section of each of the first metallic wires is larger than the second cross-section of each of the second metallic wires and larger than the third cross-section of each of the third metallic wires;
wherein the second cross-section of each of the second metallic wires is smaller than the first cross-section of each of the first metallic wires and smaller than the third cross-section of each of the third metallic wires;
wherein the first layer is between the second layer and the third layer; and
wherein the first layer, the second layer, and the third layer are welded together at each of a plurality of spaced apart weld sites.

21. The woven laminate for sound absorption of claim 20, wherein the first layer, the second layer, and the third layer are connected only at the plurality of spaced apart weld sites.

* * * * *